(12) United States Patent
Papendorf et al.

(10) Patent No.: US 7,325,858 B2
(45) Date of Patent: Feb. 5, 2008

(54) FOLDING TOP FOR A VEHICLE

(75) Inventors: Marcus Papendorf, Besigheim (DE);
Gernot Bruder, Karlsruhe (DE);
Holger Roder, Eislingen (DE)

(73) Assignee: Magna Car Top Systems GmbH,
Bietigheim-Bissingen (DE)

( * ) Notice: Subject to any disclaimer, the term of this patent is extended or adjusted under 35 U.S.C. 154(b) by 0 days.

(21) Appl. No.: 11/676,280

(22) Filed: Feb. 17, 2007

(65) Prior Publication Data
US 2007/0138826 A1 Jun. 21, 2007

Related U.S. Application Data

(63) Continuation of application No. PCT/EP2005/008688, filed on Aug. 10, 2005.

(30) Foreign Application Priority Data
Aug. 20, 2004 (DE) ...................... 10 2004 040 728

(51) Int. Cl.
*B60J 7/185* (2006.01)
(52) U.S. Cl. ...................... 296/121; 296/122; 296/124
(58) Field of Classification Search ................ 296/121, 296/122, 124
See application file for complete search history.

(56) References Cited

U.S. PATENT DOCUMENTS

| 2,376,949 | A | * | 5/1945 | Westrope | .................... 296/117 |
|---|---|---|---|---|---|
| 3,263,515 | A | * | 8/1966 | Adamski | ...................... 74/105 |
| 6,502,891 | B2 | | 1/2003 | Russke | |
| 7,134,708 | B2 | | 11/2006 | Russke | |
| 2001/0010430 | A1 | * | 8/2001 | Mentink | ................ 296/107.01 |
| 2001/0045759 | A1 | | 11/2001 | Russke | |
| 2006/0131923 | A1 | | 6/2006 | Russke et al. | |

FOREIGN PATENT DOCUMENTS

| DE | 100 21 340 C1 | 8/2001 |
|---|---|---|
| DE | 101 08 493 A1 | 9/2001 |
| DE | 101 16 094 A1 | 10/2002 |
| DE | 101 58 938 A1 | 6/2003 |
| WO | WO 2004/037585 A1 | 5/2004 |

* cited by examiner

*Primary Examiner*—Dennis H. Pedder
(74) *Attorney, Agent, or Firm*—Brooks Kushman P.C.

(57) ABSTRACT

A folding top assembly includes roof and transmission systems. The roof system includes a main link for rotatably coupling a roof to a vehicle. The main link includes a first end for coupling to the roof and a second end for rotatably coupling to the vehicle such that the main link is rotatable to move the roof between closed and opened positions. The transmission system includes tilting and drive levers. The tilting lever has two arms and a center. The second tilting arm and the first drive lever end are rotatably coupled to one another, the second drive lever end and an extension of the second main link end are rotatably coupled to one another, and the tilting center is rotatable such that the tilting lever, the drive lever, and the main link rotate to move the roof upon the first tilting arm being actuated by the actuator.

18 Claims, 4 Drawing Sheets

FOLDING TOP FOR A VEHICLE

CROSS-REFERENCE TO RELATED APPLICATIONS

This is a continuation of International Application PCT/EP2005/008688, published in German, with an international filing date of Aug. 10, 2005, which claims priority to DE 10 2004 040 728.2 filed Aug. 20, 2004, the disclosures of which are both hereby incorporated by reference.

BACKGROUND OF THE INVENTION

1. Field of the Invention

The present invention relates to folding top assemblies for vehicles.

2. Background Art

DE 101 08 493 A1 describes a multi-part hardtop roof for a vehicle. The roof is movable between a closed position covering the vehicle interior and an opened position in which the roof is lowered into the vehicle trunk. A roof kinematic system movably couples the roof to the vehicle. A universal-joint-type transmission kinematic system movably couples the roof system to the vehicle. The transmission system is actuated to move the roof system and thereby move the roof. The transmission system acts on the roof system with leverage for the roof to move from each of its positions. As a result of the leverage, force required for moving the roof system to move the roof from each of its positions is reduced.

The roof and transmission systems do not realize more extensive functions to lock the roof in the closed position. It is desirable to lock the roof in the closed position to prevent the roof from being unintentionally raised due to pressure on the roof exterior at high vehicle speeds. To avoid being raised, the roof parts of the roof are locked to one another and the front roof part is locked to the windshield frame. Such locking devices require a considerable outlay.

SUMMARY OF THE INVENTION

An object of the present invention is a folding top assembly employing relatively simple design measures for moving a folding top from its closed and opened positions in an improved manner optimized with regard to force and/or speed.

In carrying out the above object and other objects, an embodiment of the present invention provides a folding top assembly for a vehicle. The folding top assembly includes a roof kinematic system and a transmission kinematic system. The roof kinematic system has a main link for rotatably coupling a roof to the vehicle body. The main link has a first end for coupling to the roof and a second end for rotatably coupling to the vehicle body such that the main link is rotatable to move the roof between a closed position in which the roof covers the vehicle interior and an opened position in which the roof exposes the vehicle interior. The second end of the main link includes a main link extension.

The transmission system has a tilting lever and a drive lever. The tilting lever has first and second arms extending out from a center apex. The drive lever has first and second ends. The first tilting lever arm is coupled to an actuator via a rotary joint, the second tilting lever arm and the first end of the drive lever are rotatably coupled to one another via a rotary joint, the second end of the drive lever and the main link extension are rotatably coupled to one another via a rotary joint, and the center apex of the tilting lever is rotatable about a pivot point such that the tilting lever, the drive lever, and the main link rotate upon the first tilting lever arm being actuated by the actuator to thereby move the roof between the closed and opened positions.

The tilting lever and the drive lever are in a first extension position in relation to one another when the roof is in the closed position such that further movement of the roof into the closed position is prevented. The tilting lever and the drive lever are in a second extension position in relation to one another when the roof is in the opened position such that further movement of the roof into the opened position is prevented.

In an embodiment of the present invention, a folding top is securely lockable in at least one of its closed and opened positions.

In an embodiment of the present invention, a folding top is movable between a closed end position in which the folding top covers the vehicle interior and an opened (i.e., put-away) end position in which the folding top is lowered and stored in rear storage compartment of the vehicle. A roof kinematic system couples the folding top to the vehicle body. A transmission kinematic system is arranged between the roof system and the vehicle body and acts upon the roof system when actuated to move the roof system and thereby transfer the folding top between the end positions. An actuator such as a hydraulic actuating cylinder actuates the transmission system.

The transmission system includes a tilting lever and a drive lever. The actuator acts on the tilting lever to actuate the transmission system. The drive lever is articulately connected to the tilting lever. On the side facing away from the tilting lever, the drive lever is rotatably coupled to a main link of the roof system via a rotary joint. In at least one or both of the end positions of the folding top, the drive lever and the tilting lever are at least approximately in an extension position in relation to each other. In this position, the longitudinal axes of the drive lever and an upper arm of the tilting lever take up at maximum a small angle as a result of which the at least approximate extension position is reached. The upper arm of the tilting lever is articulately coupled to the drive lever. The extension position is reached exactly but embodiments with an angle of less than 20°, in particular less than 10°, are also suitable, with intermediate angular positions of between 10° and 20° and between 0° and 10° being suitable.

This extension position between the drive lever and the upper arm of the tilting lever affords the advantage that a large force multiplication can be achieved at simultaneously minimal speed of movement when raising the roof from an end position. The moment which acts on the tilting lever and is generated by the actuator is converted in the coupling point between the upper arm of the tilting lever and the drive lever into a force which acts on the drive lever and, owing to the extension position between these two components, is multiplied into a high force acting on the main link. The force acts on the main link at a distance from the bearing point thereof. This achieves an intensification of the force and a correspondingly high raising moment acting on the main link. At the beginning of the raising movement, in which the tilting lever and the drive lever are at least approximately in an extension position, the tilting lever exerts a force on the drive lever. This force is directed, in the common coupling joint, at least approximately perpendicularly to the longitudinal axis of the drive lever. This generates a high force in the longitudinal direction of the drive lever which is converted into a high moment raising the main link about its rotary joint.

The tilting lever executes a rotational movement and/or a translatory movement. The tilting lever is held on the vehicle body via lever elements and/or the actuator and does not have a body-side rotary joint. In this case, the tilting lever can be guided via a supporting lever. The supporting lever, for example, is rotatably coupled at one end to the main link of the roof system via a rotary joint and is rotatably coupled at the other end to the tilting lever via another rotary joint. When the actuator actuates the tilting lever, the tilting lever carries out a translatory movement in addition to rotating. This translatory movement may be dominant to the rotation movement.

In an embodiment of the present invention, the tilting lever is rotatably mounted to another rotary joint fixed on the vehicle body.

In an embodiment of the present invention, in at least one of the end positions of the folding top, the transmission system is in a locking position to lock the folding top in position. As such, movement of the folding top caused by external forces acting on the roof is blocked in at least one direction. Unintentional movement of the folding top can thereby be prevented. The locking position ensures external forces cannot inadvertently raise the folding top. On the contrary, raising of the folding top occurs upon actuation of the actuator which acts on the transmission system and is capable of releasing or cancelling the locking position. The secure locking of the folding top in the at least one end position is obtained without additional blocking measures or locking devices. Because the blocking takes place via the transmission system which is acted upon by the actuator to displace the folding top, a functional separation of the roof system and locking device is achieved, so that conventional roof kinematic systems can be used without an outlay on modification.

The locking position of the transmission system can be set with relatively simple measures. The transmission system can be blocked in a displacement direction by a stop and for the forces acting on the roof to generate a moment on the transmission system to displace the transmission system in the direction of the stop. In an embodiment of the present invention, the actuator is in a stop position to maintain the transmission system in the locking position. A displacement beyond this stop position of the actuator is not possible. On the other hand, the locking position can be left in the opposite direction via actuation of the actuator, in which the actuating cylinder of the actuator is moved from the stop position.

In an embodiment of the present invention, two links or levers of the transmission system, which are a coupled part of the kinematic transmission chain between the actuator and the roof system, via a rotary joint take up, in at least one end position of the roof, a position beyond the dead center which is delimited by a stop. The stop is formed by one or more links. Via actuation of the actuator, the two links or levers are transferred again from this position beyond the dead center into their functional position, in which the entire kinematic systems and the roof can move.

In order to couple superfluous degrees of movement freedom, the transmission system includes movement-restricting components such that when the actuator is actuated the tilting lever and the drive lever execute a kinematically unambiguously defined movement. These movement restriction components can include guides or stops. In an embodiment of the present invention, these components include an additional supporting lever arranged between the roof system and the transmission system. The supporting lever is articulately coupled to the main link of the roof system and to the tilting lever of the transmission system. The tilting lever is not mounted directly on the vehicle body but is guided via levers of the transmission system, in particular via the supporting lever which is mounted on the vehicle body and imposes a path of movement on the tilting lever.

In an embodiment of the present invention, the tilting lever is a triangular link. A rotary join is arranged in the region of the two end sides of the tilting lever for rotatable coupling to the drive lever and to the actuator. Another rotary joint is arranged in the center of the tilting lever for pivotable coupling to the supporting lever. Owing to the position of the supporting lever between components of the roof and transmission systems, a compact construction form is produced. In addition, the supporting lever can be used for assisting the movement. This is achieved as the supporting lever acts on the main link at a distance from the body-side rotary joint of the main link on the vehicle body. In particular, the supporting link acts on a lateral extension of the main link. This results in a lever arm with respect to the body-side rotary joint of the main link. During movement of the roof, the effective line of the supporting lever, i.e. the connecting line between the two rotary joints of the supporting lever, can intersect or cross the axis of the body-side rotary joint of the main link. As a result, the supporting force in the region of the two end positions of the roof is additionally used for supporting the rotational movement thus also minimizing the loads on the joints.

In an embodiment of the present invention, the rotary joint between supporting lever and main link may coincide with the body-side rotary joint of the main link. In this case, an additional assisting of the movement is not provided. The supporting lever nevertheless takes on its guiding function for the tilting lever and, in addition, small construction is achieved.

In an embodiment of the present invention, a guide link of the transmission system is connected rotatably to the vehicle body via a body-side rotary joint. The guide link brings about guidance of the actuator. On its side facing away from the body-side rotary joint, the guide link is articulately coupled to the actuating cylinder of the actuator. As a result, the actuating cylinder executes a kinematically unambiguously defined movement during its retraction and extension.

As an alternative to a guide link, the guidance of the actuating cylinder is achieved via body-side guides or stops or other measures.

The above features, and other features and advantages of the present invention as readily apparent from the following detailed descriptions thereof when taken in connection with the accompanying drawings.

BRIEF DESCRIPTION OF THE DRAWINGS

A folding top assembly for a vehicle in accordance with embodiments of the present invention is shown in the drawings in which.

DETAILED DESCRIPTION OF THE PREFERRED EMBODIMENT(S)

Figure 1:
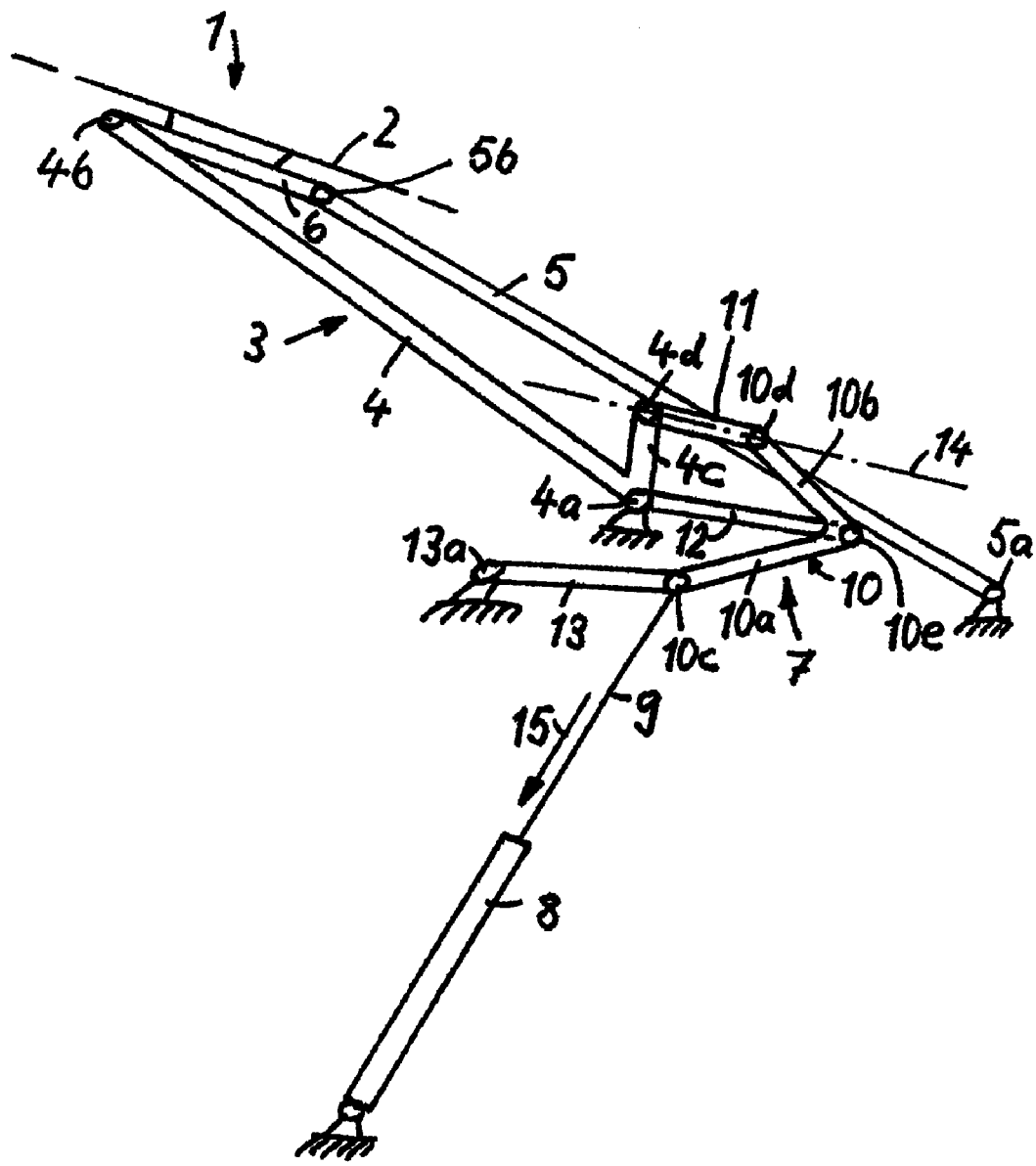
FIG. 1 illustrates a folding top assembly having a roof kinematic system for moving a folding top between closed and opened positions and a transmission kinematic system being actuable for moving the roof kinematic system to thereby move the folding top between the closed and opened positions in accordance with an embodiment of the present invention.

Referring now to FIG. 1, a folding top assembly for a vehicle having a folding top or roof 1 in accordance with an embodiment of the present invention is shown. The folding top assembly includes a roof kinematic system 3 and a transmission kinematic system 7. Roof 1 includes roof parts including roof part 2. The roof parts are coupled to one another to move together. Roof 1 is movable between a closed end position in which roof 1 covers the vehicle interior and an opened end position in which roof 1 is lowered and put-away into a rear storage compartment of the vehicle. In FIG. 1, roof 1 is in the closed position.

Roof system 3 supports roof 2 on the vehicle body. Roof system 3 is connected between roof part 2 and the vehicle body. Roof system 3 is movable to move roof 1 between the closed and opened positions.

Transmission system 7 is connected between roof system 3 and the vehicle body upstream of roof system 3. Transmission system 7 is kinematically coupled to roof system 3 such that roof system 3 displaces during an actuating movement of transmission system 7 to thereby move roof 1 between the closed and opened positions. Transmission system 7 is connected to an actuating cylinder 9 of a hydraulic actuator 8 fixed to the vehicle body. Actuator 8 actuates actuating cylinder 9 to actuate transmission system 7 in order to move roof system 3 and thereby move roof 1 between the closed and opened positions.

Roof system 3 includes a main link 4, a secondary link 5, and a connecting link 6. Main link 4 is rotatably coupled at one end to the vehicle body via a body-side rotary joint 4a. Secondary link 5 is rotatably coupled at one end to the vehicle body via a body-side rotary joint 5a. Connecting link 6 connects the other ends of links 4, 5 to one another with one end of connecting link 6 and the other end of main link 4 being rotatably coupled to one another via a rotary joint 4b and the other end of connecting link 6 and the other end of secondary link 5 being rotatably coupled to one another via a rotary joint 5b. Links 4, 5, 6 form a four-bar kinematic system.

Transmission system 7 includes a triangular tilting lever 10, a drive lever 11, a supporting lever 12, and a guide link 13. Tilting lever 10 includes lower and upper tilt arms 10a, 10b arranged at an angle to one another. Tilt arms 10a, 10b extend out from a center apex of tilting lever 10. Lower tilt arm 10a is rotatably coupled to actuating cylinder 9 via a rotary joint 10c. Upper tilt arm 10b is rotatably coupled to one end of drive lever 11 via a rotary joint 10d.

The other end of drive lever 11 is rotatably coupled to one end of an extension link 4c of main link 4 via a rotary joint 4d. Starting from body-side joint 4a, main link extension 4c extends at an angle to main link 4 with the axis of joint 4d lying at a distance from the axis of joint 4a. This distance constitutes a "lever arm" for introducing rotational movement to roof system 3.

One end of supporting lever 12 is rotatably coupled to the center apex of tilting lever 10 via a rotary joint 10e. The other end of supporting lever 12 is rotatably coupled to the one end of main link 4 via body-side joint 4a. Supporting lever 12 functions to stabilize and guide transmission system 7 and connect superfluous degrees of movement freedom.

Guide link 13 is rotatably coupled at one end to the vehicle body via a body-side rotary joint 13a. The other end of guide link 13 is rotatably coupled to lower tilt arm 10a and actuating cylinder 9 via joint 10c. Guide link 13 thereby brings about guiding of actuating cylinder 9.

In the closed position of roof 1, actuating cylinder 9 is fully extended with tilting lever 10 and drive lever 11 being in a beyond dead center position. An effective line 14 runs through joints 4d, 10d of drive lever 11 parallel to supporting lever 12 and above joint 10e between tilting lever 10 and supporting lever 12. In response to an external force acting on roof 1 to raise roof 1 from its closed position, roof system 3 is pressured to move in the clockwise direction about body-side joint 4a. The pivoting-up movement of roof 1 is blocked as the fully extended actuating cylinder 9 prevents drive lever 11, owing to its effective line 14 running above joint 10e, from displacing tilting lever 10 in the clockwise direction about joint 10e. The pivoting-up movement of roof 1 via guide link 13 and joint 10c generates an opposed moment rotating in the counterclockwise direction about joint 10e as guide link 13 runs above the effective line of lower tilting arm 10a. Given a suitable selection of the kinematic points and effective distances, this moment rotating in the counterclockwise direction is smaller than the moment which rotates in the clockwise direction and which is introduced via drive lever 11 and acts about joint 10e. Since the resulting moment acts in the clockwise direction, tilting lever 10 endeavors to carry out a pivoting movement in the clockwise direction about joint 10e, but this is prevented by extended actuator 8 which is in a stop position. Transmission system 7 is therefore in a locking position which prevents roof 1 from undesirably raising.

Actuator 8 actuates to retract actuating cylinder 9 along arrow direction 15 from its completely extended position to displace roof 1 from its closed position to its opened position. At the beginning of the opening movement, tilting lever 10 initially tilts in the counterclockwise direction about joint 10e, on which supporting lever 12 is supported, as a result of which tilting lever 10 and drive lever 11 are raised from their beyond dead center position and transmission system 7 leaves its locked position. During the course of this movement, titling lever 10 pulls drive lever 11. This tensile force is converted via the coupling of drive lever 11 to main link extension 4c into a torque about body-side joint 4a. This torque acts in the clockwise direction and displaces roof system 3 in the clockwise direction to move roof 1 toward its opened position. When the extension position (i.e., the dead center position) of upper tilting arm 10b and drive lever 11 is reached, a large multiplication of the force is achieved at simultaneously minimum movement speed in transmission system 7, with the result that roof 1 is raised from its closed position with relatively high force at a relatively low raising speed.

Transmission system 7 takes up the locking position in both of the closed and opened positions of roof 1. In at least one of these two end positions, transmission system 7 takes up its locking position by reaching a position beyond the dead center or, if appropriate, a dead center position or an extension position, with the stop required for limiting the position beyond the dead center being able to act on tilting lever 10, drive lever 11, guide link 13, and/or main link 4.

Joint 10e may be fixedly connected on the vehicle body. In this case, supporting lever 12 and guide link 13 can be omitted.

Figure 2:
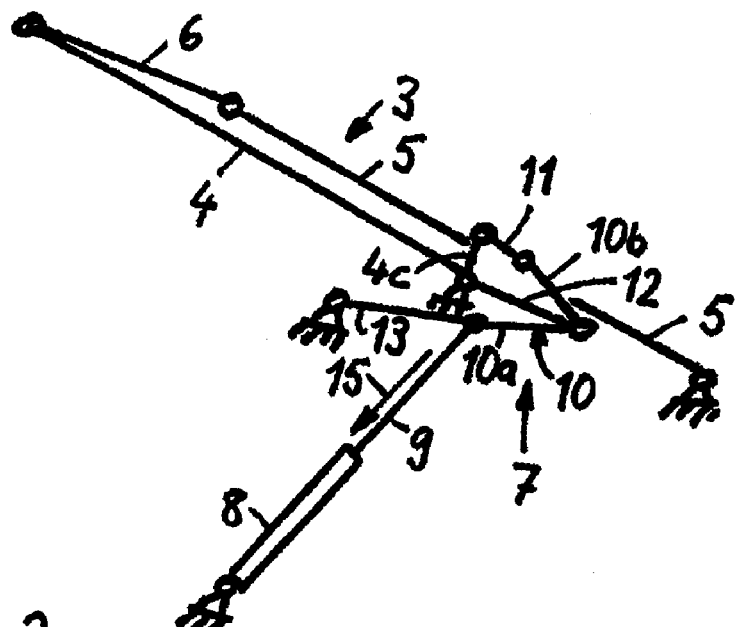
FIG. 2 illustrates the roof and transmission kinematic systems when the folding top is in the closed position.
Figure 3:
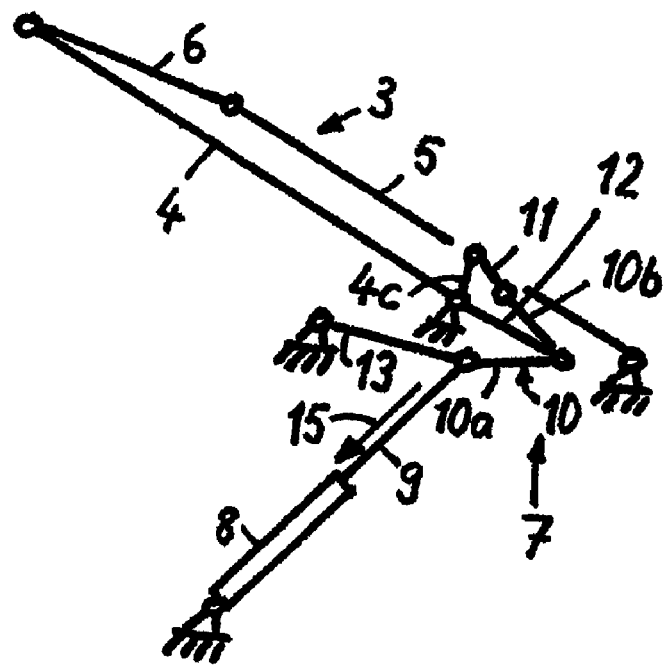
FIG. 3 illustrates the roof and transmission kinematic systems when the folding top is at a position near the closed position as the roof and transmission kinematic systems are functioning to move the folding top towards the opened position.
Figure 4:
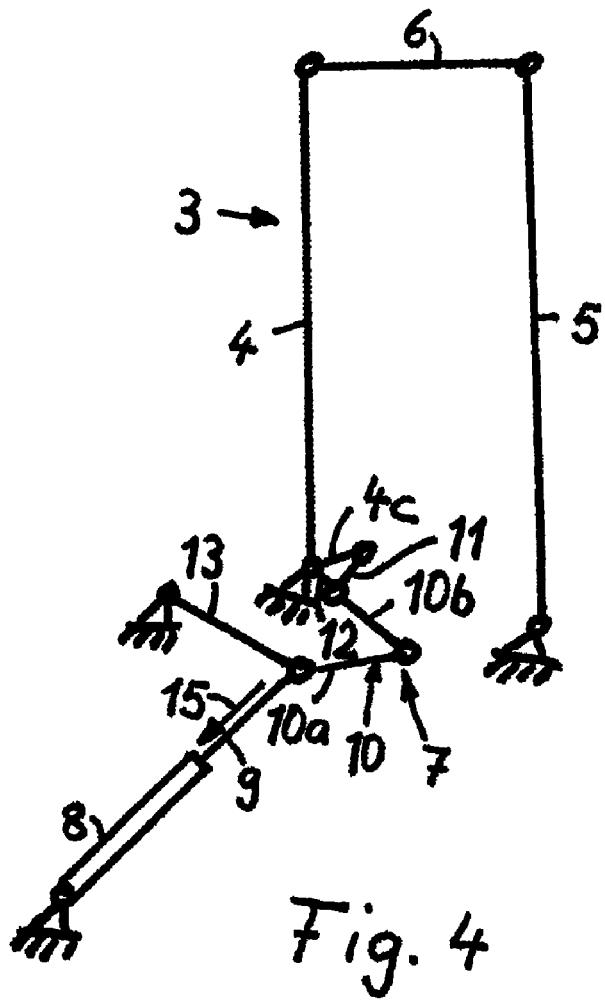
FIG. 4 illustrates the roof and transmission kinematic systems when the folding top is at a position near the opened position as the roof and transmission kinematic systems are functioning to move the folding top towards the opened position.
Figure 5:
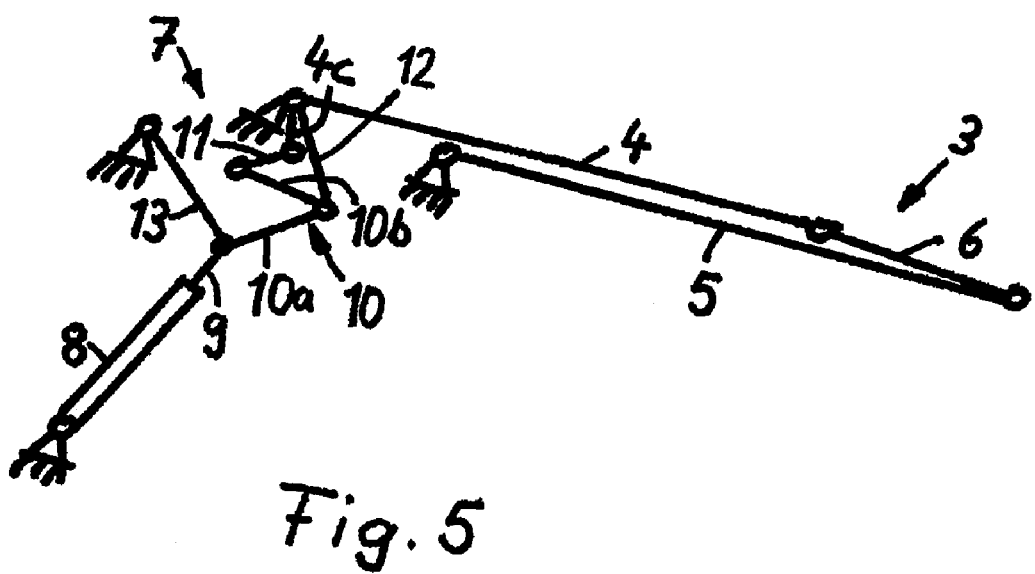
FIG. 5 illustrates the roof and transmission kinematic systems when the folding top is in the opened position.

Referring now to FIGS. 2, 3, 4, and 5, with continual reference to FIG. 1, positions of roof system 3 and transmission system 7 as roof 1 moves from the closed position to the opened position are shown. FIG. 2 illustrates roof system 3 and transmission system 7 when roof 1 is in the closed position. FIG. 3 illustrates roof system 3 and transmission system 7 when roof 1 is at a position near the closed position as transmission system 7 is being actuated to move roof system 3 in order to move roof 1 towards the opened position. FIG. 4 illustrates roof system 3 and transmission system 7 when roof 1 is at a position near the opened position as transmission system 7 is being actuated to move roof system 3 in order to move roof 1 towards the opened position. FIG. 5 illustrates roof system 3 and transmission system 7 when roof 1 is in the opened position.

After the position beyond the dead center, illustrated in FIGS. 1 and 2, has been left during retraction of actuating cylinder 9 at the beginning of the opening movement, and an extension position illustrated in FIG. 3 is reached. In the further course of the actuating movement from the initial tilting movement of tilting lever 10 a virtually linear guiding movement of drive lever 11 is achieved. This guiding movement is achieved as the movements of supporting lever 12 and guide link 13 are superimposed on the rotation about the tilting axis of tilting lever 10 about joint 10e. The points of the joints are selected in such a manner that the lever arm of drive lever 11 (i.e., main link extension 4c) which is effective about body-side joint 4a of main link 4 initially decreases in an advanced phase of movement during the opening movement of roof 1 to the same extent as the load movement and subsequently increases again with the result that the force remains virtually constant as a result of which the maximum force is also minimized. In this advanced section of movement, illustrated in FIG. 4, actuating cylinder 9 retains its approximately right-angle position relative to guide link 13.

In the opened position illustrated in FIG. 5, actuating cylinder 9 is completely retracted. Drive lever 11 is at an approximately right angle to main link extension 4c. Analogously to the opposite end position, this position permits a force-effective raising of roof 1 with a simultaneously low speed of movement during an extension of actuating cylinder 9 for transferring roof 1 from the opened position into the closed position.

Figure 6:
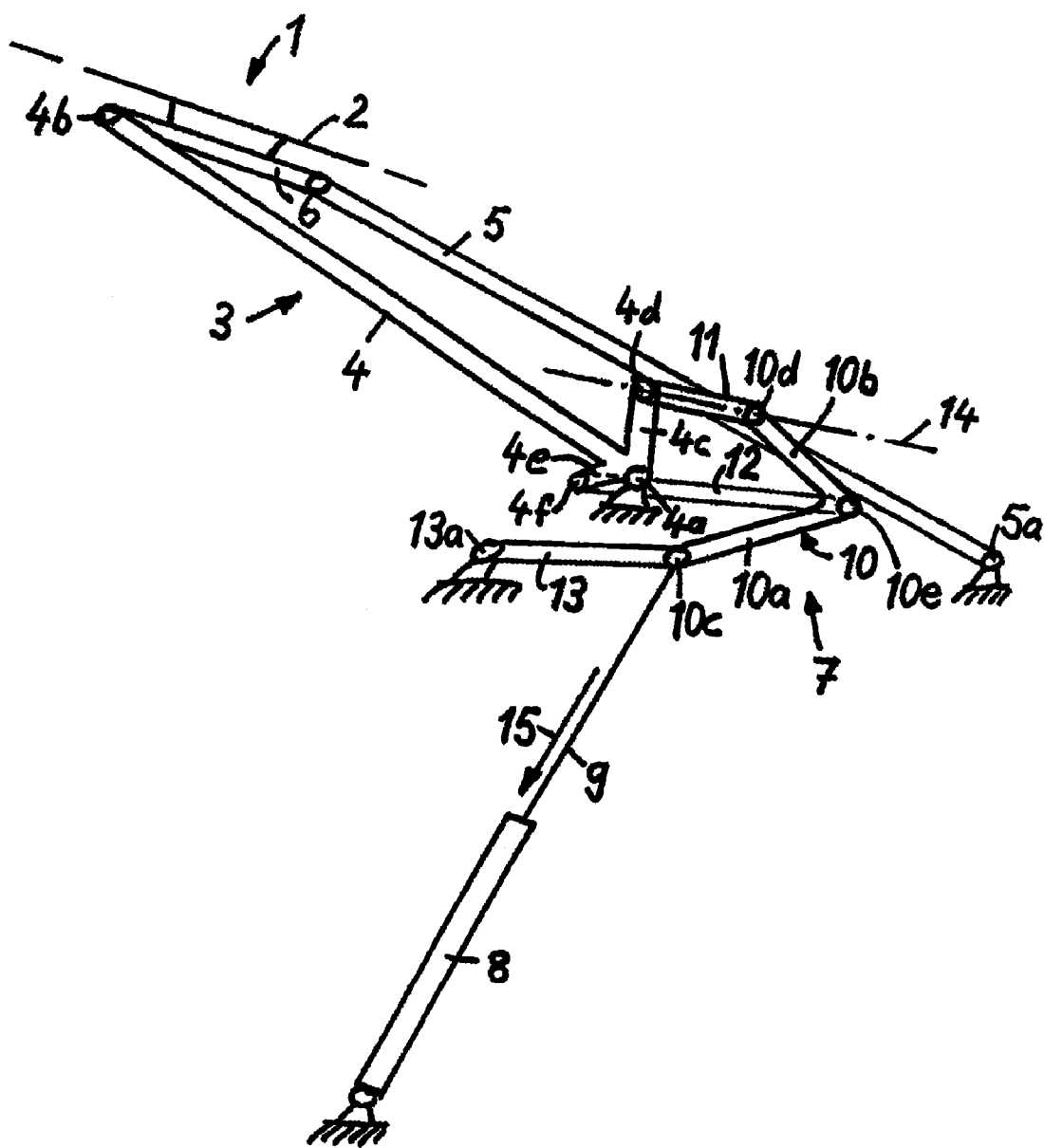
FIG. 6 illustrates a folding top assembly having a roof kinematic system for moving a folding top between closed and opened positions and a transmission kinematic system being actuable for moving the roof kinematic system to thereby move the folding top between the closed and opened positions in accordance with another embodiment of the present invention.

FIG. 6 illustrates a folding top assembly in accordance with another embodiment of the present invention. In this embodiment, main link 4 includes a second extension 4e. Extension 4e is situated on the opposite side to extension 4c. A rotary joint 4f is fitted in the outer section of extension 4e. Extension 4e is connected rotatably to supporting lever 12 via joint 4f. The point of the joint between supporting lever 12 and extension 4e is therefore situated at a distance from the axis of body-side joint 4a. During the opening movement of roof 1, the effective line of supporting lever 12 (i.e., the connecting line through joints 4f, 10e of supporting lever 12) migrates over the axis of rotation of body-side joint 4a. In the closed position (illustrated in FIG. 6) the effective line of supporting lever 12 and effective line 14 of drive lever 11 lie on opposite sides of body-side joint 4a. The supporting force transmitted via supporting lever 12 is transmitted via joint 4f and extension 4e to main link 4 and brings about an additional, supporting torque about body-side joint 4a. This torque acts in the same direction as the torque introduced via drive lever 11. The supporting force of supporting lever 12 therefore acts in a manner assisting the opening force of drive lever 11.

Since the effective line of supporting lever 12 exceeds body-side joint 4a in the course of the putting-away movement of roof 1, the effective line of supporting lever 12 is situated on the same side of joint 4a as effective line 14 of drive lever 11 in the opened position. During the raising of roof 1 from the opened position, the supporting force of supporting lever 12 therefore also acts to assist the raising force of drive lever 11.

A further advantage of the supporting force transmitted via supporting lever 12 resides in the relieving of the remaining joints of the kinematic systems from load.

Transmission system 7 is designed in such a manner that the speed of movement of roof system 3 is always further reduced as it approaches each of the two roof end positions despite the actuating speed of actuator 8 remaining the same. The same applies to the raising movement from each of the two roof end positions. In addition, during the reduced approaching or raising speed, the respective raising or braking force is increased. The maximum speed of movement of the kinematic systems and of roof 1 is reached in a central position between the two end positions.

As in the case of the first embodiment, the locking in the closed position of roof 1 is achieved by tilting lever 10 being blocked via the completely extended actuator 8. Since in the case of an erecting force which acts on roof 1 and endeavors to erect roof 1, a resulting moment is generated in the clockwise direction about joint 10e but a movement of tilting lever 10 about this joint 10e is prevented on account of the coupling to actuating cylinder 9, roof 1 is in the locking position.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A folding top assembly for a vehicle, the folding top assembly comprising:

a roof system having a main link for rotatably coupling a roof to the vehicle body, the main link having a first end for coupling to the roof and a second end for rotatably coupling to the vehicle body such that the main link is rotatable to move the roof between a closed position in which the roof covers the vehicle interior and an opened position in which the roof exposes the vehicle interior, wherein the second end of the main link includes a main link extension; and a transmission system having a tilting lever and a drive lever, the tilting lever having first and second arms extending out from a center apex, the drive lever having first and second ends;

wherein the first tilting lever arm is coupled to an actuator via a rotary joint, the second tilting lever arm and the first end of the drive lever are rotatably coupled to one another via a rotary joint, the second end of the drive lever and the main link extension are rotatably coupled to one another via a rotary joint, and the center apex of the tilting lever is rotatable about a pivot point such that the tilting lever, the drive lever, and the main link rotate upon the first tilting lever arm being actuated by the actuator to thereby move the roof between the closed and opened positions;

wherein the tilting lever and the drive lever are in a first extension position in relation to one another when the roof is in the closed position such that unintentional movement of the roof into the opened position is prevented;

wherein the tilting lever and the drive lever are in a second extension position in relation to one another when the roof is in the opened position such that unintentional movement of the roof into the closed position is prevented.

2. The folding top assembly of claim 1 wherein:

the transmission system further includes a supporting lever having first and second ends, the first end of the supporting lever and the second end of the main link being rotatably coupled to one another via a rotary joint, the second end of the supporting lever and the center apex of the tilting lever being rotatably coupled to one another via a rotary joint.

3. The folding top assembly of claim 2 wherein:

the rotary joint between the supporting lever and the center apex of the tilting lever is situated between the rotary joints of the first and second tilting lever arms.

4. The folding top assembly of claim 2 wherein:

the second end of the main link further includes a second extension;

wherein the rotary joint between the supporting lever and the second end of the main link is arranged on the second main link extension at a distance from the axis of rotation of the second end of the main link.

5. The folding top assembly of claim 2 wherein:

during displacement of the roof between the opened and closed positions, an effective line connecting the rotary joints of the supporting lever intersects the axis of rotation of the second end of the main link.

6. The folding top assembly of claim 2 wherein:

the rotary joint between the supporting lever and the second end of the main link coincides with the axis of rotation of the second end of the main link.

7. The folding top assembly of claim 1 wherein:

in the closed position of the roof, the actuator is fully extended to lock the transmission system in place to prevent unintentional movement of the roof;

wherein in the opened position of the roof, the actuator is fully retracted to lock the transmission system in place to prevent unintentional movement of the roof.

8. A folding top assembly for a vehicle, the folding top assembly comprising:

an actuator;

a roof system having a main link for rotatably coupling a roof to the vehicle body, the main link having a first end for coupling to the roof and a second end for rotatably coupling to the vehicle body such that the main link is rotatable to move the roof between a closed position in which the roof covers the vehicle interior and an opened position in which the roof exposes the vehicle interior, wherein the second end of the main link includes a main link extension; and a transmission system having a tilting lever and a drive lever, the tilting lever having first and second arms extending out from a center apex, the drive lever having first and second ends;

wherein the first tilting lever arm is coupled to the actuator via a rotary joint, the second tilting lever arm and the first end of the drive lever are rotatably coupled to one another via a rotary joint, the second end of the drive lever and the main link extension are rotatably coupled to one another via a rotary joint, and the center apex of the tilting lever is rotatable about a pivot point such that the tilting lever tilts, the drive lever rotates, and the main link rotates upon the first tilting lever arm being actuated by the actuator to thereby move the roof between the closed and opened positions;

wherein the tilting lever and the drive lever are in a first extension position in relation to one another when the roof is in the closed position such that unintentional movement of the roof into the opened position is prevented;

wherein the tilting lever and the drive lever are in a second extension position in relation to one another when the roof is in the opened position such that unintentional movement of the roof into the closed position is prevented.

9. The folding top assembly of claim 8 wherein:

longitudinal axes of the drive lever and the second tilting lever arm enclose an acute angle in the opened position.

10. The folding top assembly of claim 8 wherein:

the transmission system further includes a supporting lever having first and second ends, the first end of the supporting lever and the second end of the main link being rotatably coupled to one another via a rotary joint, the second end of the supporting lever and the center apex of the tilting lever being rotatably coupled to one another via a rotary joint.

11. The folding top assembly of claim 10 wherein:

the rotary joint between the supporting lever and the center apex of the tilting lever is situated between the rotary joints of the first and second tilting lever arms.

12. The folding top assembly of claim 10 wherein:

the second end of the main link further includes a second extension;

wherein the rotary joint between the supporting lever and the second end of the main link is arranged on the second main link extension at a distance from the axis of rotation of the second end of the main link.

13. The folding top assembly of claim 10 wherein:

during displacement of the roof between the opened and closed positions, an effective line connecting the rotary joints of the supporting lever intersects the axis of rotation of the second end of the main link.

14. The folding top assembly of claim 10 wherein:

the rotary joint between the supporting lever and the second end of the main link coincides with the axis of rotation of the second end of the main link.

15. The folding top assembly of claim 8 wherein:

in the closed position of the roof, the actuator is fully extended to lock the transmission system in place to prevent unintentional movement of the roof.

16. The folding top assembly of claim 8 wherein:

in the opened position of the roof, the actuator is fully retracted to lock the transmission system in place to prevent unintentional movement of the roof.

17. The folding top assembly of claim 8 wherein:

the transmission system further includes a guide link having first and second ends, wherein the first end of the guide link is rotatably coupled to a rotary joint and the second end of the guide link and the first tilting lever arm are rotatably coupled to one another.

18. The folding top assembly of claim 8 wherein:

the roof system is a four-bar kinematic system.

* * * * *